US011867277B2

United States Patent
Oda (10) Patent No.: US 11,867,277 B2
(45) Date of Patent: Jan. 9, 2024

(54) VEHICLE TRANSAXLE

(71) Applicant: TOYOTA JIDOSHA KABUSHIKI KAISHA, Toyota (JP)

(72) Inventor: Shingo Oda, Aichi-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 94 days.

(21) Appl. No.: 17/495,887

(22) Filed: Oct. 7, 2021

(65) Prior Publication Data

US 2022/0145980 A1    May 12, 2022

(30) Foreign Application Priority Data

Nov. 9, 2020    (JP) ................................ 2020-186836

(51) Int. Cl.
*F16H 57/028*    (2012.01)
*F16H 57/021*    (2012.01)
*B60K 6/405*    (2007.10)
*F16H 57/02*    (2012.01)

(52) U.S. Cl.
CPC ........... *F16H 57/028* (2013.01); *B60K 6/405* (2013.01); *F16H 57/021* (2013.01); *F16H 2057/02013* (2013.01); *F16H 2057/02034* (2013.01); *F16H 2057/02052* (2013.01)

(58) Field of Classification Search
CPC .............. F16H 57/028; F16H 57/021; F16H 2057/02013; F16H 2057/02034; F16H 2057/02052; B60K 6/405; G10K 11/172
See application file for complete search history.

(56) References Cited

U.S. PATENT DOCUMENTS

| | | | | |
|---|---|---|---|---|
| 1,782,912 A | * | 11/1930 | Snook | F16H 57/028 |
| | | | | 74/606 R |
| 3,942,502 A | * | 3/1976 | Gorres | F02B 69/00 |
| | | | | 192/112 |
| 10,088,796 B2 | * | 10/2018 | Ishida | G10K 11/172 |
| 2013/0301220 A1 | | 11/2013 | Hotta et al. | |
| 2019/0084403 A1 | * | 3/2019 | Nishikawa | B60K 17/105 |
| 2020/0215997 A1 | * | 7/2020 | Kato | F23M 20/005 |

FOREIGN PATENT DOCUMENTS

| | | |
|---|---|---|
| JP | 2020-112174 A | 7/2020 |
| WO | 2012/105353 A1 | 8/2012 |
| WO | 2012/144078 A1 | 10/2012 |

* cited by examiner

*Primary Examiner* — Thomas C Diaz
(74) *Attorney, Agent, or Firm* — Oliff PLC (57) ABSTRACT

A resonator having a cavity and an opening is formed. The cavity is formed between a transaxle case and a facing wall, of a first housing case, that faces the transaxle case. The opening is configured such that the cavity is partially opened to a lateral side through the opening. A volume of the cavity and a volume of the opening are set such that a resonance frequency of the resonator is lower than a natural frequency of the facing wall of the first housing case. Since the resonance frequency of the resonator is lower than the natural frequency of the facing wall, even when the facing wall vibrates at the natural frequency, the cavity does not resonate. Hereby, abnormal noise caused from the transaxle can be reduced.

7 Claims, 5 Drawing Sheets

FIG. 6 ural frequency of the first facing wall of the first housing case.

VEHICLE TRANSAXLE

CROSS-REFERENCE TO RELATED APPLICATION

This application claims priority to Japanese Patent Application No. 2020-186836 filed on Nov. 9, 2020, incorporated herein by reference in its entirety.

BACKGROUND

1. Technical Field

The present disclosure relates to a vehicle transaxle configured such that a housing case in which a first vibration element is accommodated is fixed to a transaxle case at a predetermined interval and relates to a technology to reduce abnormal noise caused from the vehicle transaxle.

2. Description of Related Art

The following vehicle transaxle is well known. That is, the vehicle transaxle is configured such that a first housing case in which a first vibration element is accommodated is fixed, at a predetermined interval, to a transaxle case in which a vehicle driving electric motor is accommodated. An example of such a vehicle transaxle is a vehicle transaxle described in WO 2012/105353. The vehicle transaxle described in WO 2012/105353 is configured such that a first housing case in which a DC/DC converter including a switching element is accommodated is fixed, at a predetermined interval, to a transaxle case, for example.

SUMMARY

In the meantime, in the vehicle transaxle, vibrations may be caused from the DC/DC converter, for example, by a switching operation on the switching element. Accordingly, when a wall constituting the first housing case resonates by being excited by the vibrations caused from the DC/DC converter, for example, a space (cavity) between the wall of the first housing case and the transaxle case or a second housing case fixed on the transaxle case might resonate with the wall of the first housing case as a vibration source (a sound source), so that abnormal noise might be caused from the vehicle transaxle.

The present disclosure has been achieved in view of the above circumstances as a background, and an object of the present disclosure is to provide a vehicle transaxle that reduces the occurrence of abnormal noise.

A first aspect of the present disclosure is as follows. (a) A vehicle transaxle is configured such that a first housing case is fixed to a transaxle case at a predetermined interval, the first housing case being configured such that a first vibration element is accommodated in the first housing case, the transaxle case being configured such that a vehicle driving electric motor is accommodated in the transaxle case. (b) The vehicle transaxle includes a resonator having a cavity and an opening, the cavity being formed between the transaxle case and a first facing wall of the first housing case, the first facing wall facing the transaxle case, the opening being formed such that the cavity is partially opened to a lateral side through the opening. (c) A volume of the cavity and a volume of the opening are set such that a resonance frequency of the resonator is lower than a natural frequency of the first facing wall of the first housing case.

Further, a second aspect of the present disclosure is as follows. That is, in the first aspect of the present disclosure, (a) a second housing case in which a second vibration element is accommodated may be fixed to the transaxle case such that the second housing case is disposed at a predetermined interval from the first facing wall of the first housing case. (b) The cavity may be formed between the first facing wall and a second facing wall of the second housing case, the second facing wall facing the first facing wall. (c) The volume of the cavity and the volume of the opening may be set such that the resonance frequency of the resonator is lower than the natural frequency of the first facing wall and a natural frequency of the second facing wall.

Further, a third aspect of the present disclosure is as follows. That is, in the second aspect of the present disclosure, (a) the vehicle transaxle may include a first partition wall projecting toward the transaxle case from a position, in the first housing case, that surrounds a periphery of the cavity, and a second partition wall projecting toward the first partition wall from the second housing case. (b) The opening may be continuously formed between a distal end of the first partition wall and a distal end of the second partition wall such that the opening surrounds the periphery of the cavity.

Further, a fourth aspect of the present disclosure is as follows. That is, in the second aspect of the present disclosure, (a) the vehicle transaxle may include a peripheral wall via which respective positions, in the first housing case and the second housing case, that surround a periphery of the cavity are connected to each other. (b) The opening may be constituted by a through-hole penetrating through the peripheral wall.

Further, a fifth aspect of the present disclosure is as follows. That is, in the fourth aspect of the present disclosure, the opening may be constituted by a tubular member connected to the through-hole.

Further, a sixth aspect of the present disclosure is as follows. That is, in the second aspect of the present disclosure, (a) the vehicle transaxle may include a partition wall projecting toward the first housing case from a position, in the second housing case, that surrounds a periphery of the cavity. (b) The opening may be continuously formed between a distal end of the partition wall and the first housing case such that the opening surrounds the periphery of the cavity.

Further, a seventh aspect of the present disclosure is as follows. That is, in the first aspect of the present disclosure, (a) a third facing wall facing the first facing wall of the first housing case may be formed in the transaxle case. (b) The cavity may be formed between the first facing wall and the third facing wall. (c) The volume of the cavity and the volume of the opening may be set such that the resonance frequency of the resonator is lower than the natural frequency of the first facing wall and a natural frequency of the third facing wall.

Further, an eighth aspect of the present disclosure is as follows. That is, in the seventh aspect of the present disclosure, (a) the vehicle transaxle may include a third partition wall projecting toward the transaxle case from a position, in the first housing case, that surrounds a periphery of the cavity. (b) The opening may be continuously formed between a distal end of the third partition wall and the transaxle case such that the opening surrounds the periphery of the cavity.

In the vehicle transaxle according to the first aspect of the present disclosure, (b) the resonator has the cavity and the opening. The cavity is formed between the transaxle case and the first facing wall of the first housing case, the first facing wall facing the transaxle case. The opening is formed such that the cavity is partially opened to the lateral side through the opening. (c) The volume of the cavity and the volume of the opening are set such that the resonance frequency of the resonator is lower than the natural frequency of the first facing wall of the first housing case. Since the resonance frequency of the resonator is lower than the natural frequency of the first facing wall, even when the first facing wall vibrates at the natural frequency, the cavity does not resonate. Hereby, abnormal noise caused from the vehicle transaxle can be reduced.

In the vehicle transaxle of the second aspect of the present disclosure, (a) the second housing case in which the second vibration element is accommodated is fixed to the transaxle case such that the second housing case is disposed at the predetermined interval from the first facing wall of the first housing case. (b) The cavity is formed between the first facing wall and the second facing wall of the second housing case, the second facing wall facing the first facing wall. (c) The volume of the cavity and the volume of the opening are set such that the resonance frequency of the resonator is lower than the natural frequency of the first facing wall and the natural frequency of the second facing wall. Since the resonance frequency of the resonator is lower than the natural frequency of the first facing wall and the natural frequency of the second facing wall, even when the first facing wall vibrates at its natural frequency and the second facing wall vibrates at its natural frequency, for example, the cavity does not resonate. Hereby, abnormal noise caused from the vehicle transaxle can be reduced.

The vehicle transaxle of the third aspect includes (a) the first partition wall projecting toward the transaxle case from the position, in the first housing case, that surrounds the periphery of the cavity, and the second partition wall projecting toward the first partition wall from the second housing case. (b) The opening is continuously formed between the distal end of the first partition wall and the distal end of the second partition wall such that the opening surrounds the periphery of the cavity. Due to the volume of the opening formed as such and the volume of the cavity, the resonance frequency of the resonator is made lower than the natural frequencies of the first facing wall and the second facing wall.

In the vehicle transaxle of the fourth aspect, (a) the peripheral wall is formed such that respective positions, in the first housing case and the second housing case, that surround the periphery of the cavity are connected to each other, and (b) the opening is formed by the through-hole penetrating through the peripheral wall. Due to the volume of the opening formed as such and the volume of the cavity, the resonance frequency of the resonator is made lower than the natural frequencies of the first facing wall and the second facing wall.

In the vehicle transaxle of the fifth aspect, the opening is formed by the tubular member connected to the through-hole. Due to the volume of the opening formed as such and the volume of the cavity, the resonance frequency of the resonator is made lower than the natural frequencies of the first facing wall and the second facing wall.

The vehicle transaxle of the sixth aspect includes (a) the partition wall projecting toward the first housing case from the position, in the second housing case, that surrounds the periphery of the cavity, and (b) the opening is continuously formed between the distal end of the partition wall and the first housing case such that the opening surrounds the periphery of the cavity. Due to the volume of the opening formed as such and the volume of the cavity, the resonance frequency of the resonator is made lower than the natural frequencies of the first facing wall and the second facing wall.

In the vehicle transaxle of the seventh aspect, (a) the third facing wall facing the first facing wall of the first housing case is formed in the transaxle case, (b) the cavity is formed between the first facing wall and the third facing wall, and (c) the volume of the cavity and the volume of the opening are set such that the resonance frequency of the resonator is lower than the natural frequency of the first facing wall and the natural frequency of the third facing wall. Since the resonance frequency of the resonator is lower than the natural frequency of the first facing wall and the natural frequency of the third facing wall, even when the first facing wall vibrates at its natural frequency and the third facing wall vibrates at its natural frequency, for example, the cavity does not resonate. Hereby, abnormal noise caused from the vehicle transaxle can be reduced.

The vehicle transaxle of the eighth aspect includes (a) the third partition wall projecting toward the transaxle case from the position, in the first housing case, that surrounds the periphery of the cavity, and (b) the opening is continuously formed between the distal end of the third partition wall and the transaxle case such that the opening surrounds the periphery of the cavity. Due to the volume of the opening formed as such and the volume of the cavity, the resonance frequency of the resonator is made lower than the natural frequencies of the first facing wall and the third facing wall.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Embodiments of the present disclosure will hereinafter be described in detail with reference to the attached drawings.

Embodiment 1

Figure 1:
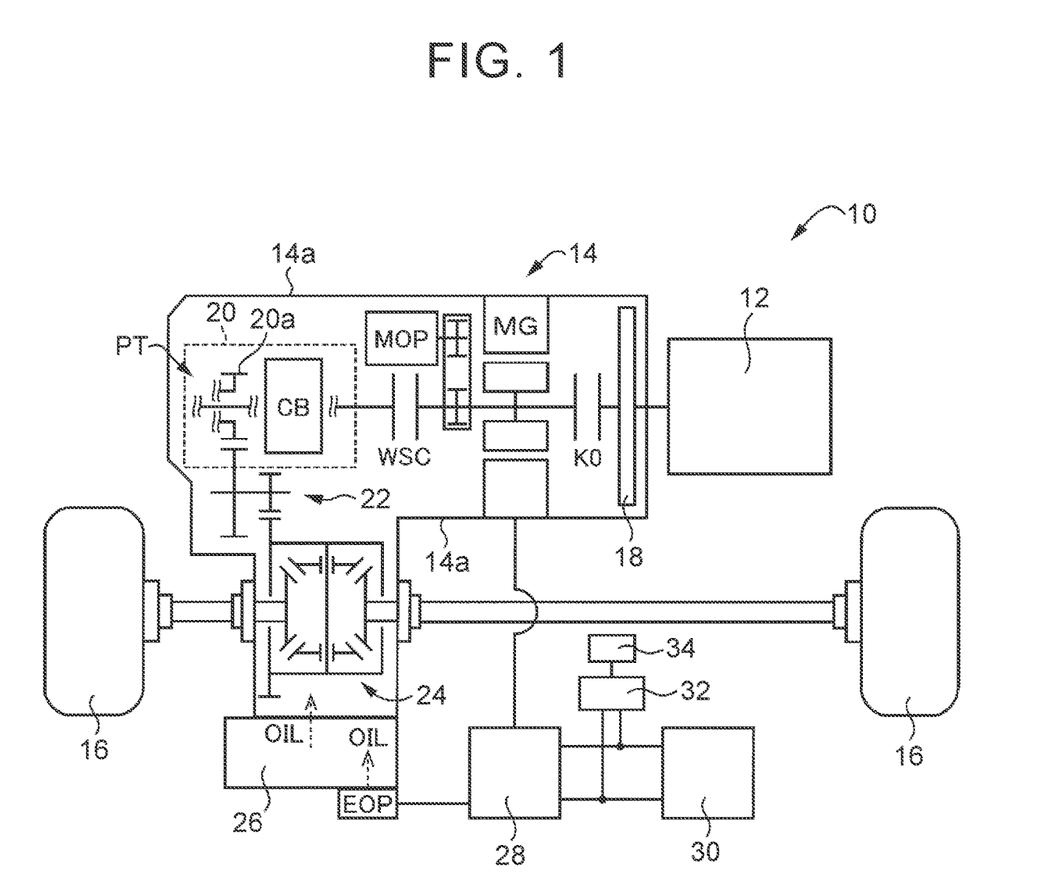
FIG. 1 is a view to describe a schematic configuration of a vehicle to which the present disclosure is applied.

FIG. 1 is a view to describe a schematic configuration of a vehicle 10 to which the present disclosure is applied. As illustrated in FIG. 1, the vehicle 10 includes an engine 12, a transaxle (a vehicle transaxle) 14 made of light metal, and driving wheels 16. As illustrated in FIG. 1, the transaxle 14 is configured such that a damper 18, a disconnection clutch K0, an electric motor (a vehicle driving electric motor) MG, a start clutch WSC, an automatic transmission 20, and so on are accommodated in a transaxle case 14a that is a nonrotatable member attached to a vehicle body. Further, the transaxle 14 is configured such that a reduction gear mechanism 22 connected in a power transmittable manner to a transmission output gear 20a as an output rotational member of the automatic transmission 20, a differential gear 24 connected in a power transmittable manner to the reduction gear mechanism 22, and so on are accommodated in the transaxle case 14a. Note that the damper 18 is provided between the engine 12 and the disconnection clutch K0 in a power transmission path PT formed such that power of the engine 12 and power of the electric motor MG are transmittable to the driving wheels 16. Further, the disconnection clutch K0 is provided between the engine 12 and the electric motor MG in the power transmission path PT. Further, the start clutch WSC is provided between the automatic transmission 20 and each of the engine 12 and the electric motor MG in the power transmission path PT. Further, the automatic transmission 20 is connected in a power transmittable manner to the engine 12 via the disconnection clutch K0, the start clutch WSC, and so on, and the automatic transmission 20 is connected in a power transmittable manner to the electric motor MG via the start clutch WSC and so on.

The damper 18 is a so-called torsional damper including an elastic member such as a compressed coil spring, for example, and configured to absorb torque fluctuations of the engine 12 and absorb torsional vibrations.

The disconnection clutch K0 is a wet or dry frictional engagement device constituted by a multi-disc or single-disc clutch to be pressed by an actuator, for example. An operational state of the disconnection clutch K0, that is, a control state of the disconnection clutch K0, e.g., an engaged state, a disengaged state, a slip state, and so on, is changed such that a torque capacity of the disconnection clutch K0 is changed by an adjusted engagement hydraulic pressure for the disconnection clutch K0, the adjusted engagement hydraulic pressure being supplied from a hydraulic-pressure control circuit 26 provided in the vehicle 10.

The start clutch WSC is a wet or dry frictional engagement device constituted by a multi-disc or single-disc clutch to be pressed by an actuator, for example. A control state of the start clutch WSC, e.g., an engaged state, a disengaged state, a slip state, and so on, is changed such that a torque capacity of the start clutch WSC is changed by an adjusted engagement hydraulic pressure for the start clutch WSC, the adjusted engagement hydraulic pressure being supplied from the hydraulic-pressure control circuit 26.

The automatic transmission 20 is a well-known planetary gear automatic transmission including one or more planetary gear devices (not illustrated) and a plurality of engaging devices CB, for example. The engaging device CB is a hydraulic frictional engagement device constituted by a multi-disc or single-disc clutch or brake to be pressed by a hydraulic actuator, a band brake to be tightened by a hydraulic actuator, or the like, for example. A control state of the engaging device CB, e.g., an engaged state, a disengaged state, a slip state, and so on, is changed such that a torque capacity of the engaging device CB is changed by an adjusted engagement hydraulic pressure for the engaging device CB, the adjusted engagement hydraulic pressure being supplied from the hydraulic-pressure control circuit 26. Note that the hydraulic-pressure control circuit 26 supplies the engagement hydraulic pressure for the disconnection clutch K0, the engagement hydraulic pressure for the start clutch WSC, the engagement hydraulic pressure for the engaging device CB, and so on. Those engagement hydraulic pressures are each adjusted based on a hydraulic fluid OIL discharged from a mechanical oil pump MOP and/or an electric-motor-driven oil pump EOP.

The electric motor MG is a rotating electrical machine having a function as a motor configured to generate mechanical power from electric power and a function as a generator configured to generate electric power from mechanical power. The electric motor MG is a so-called motor generator. The electric motor MG is connected to a battery 30 provided in the vehicle 10 via an inverter 28 provided in the vehicle 10 as illustrated in FIG. 1. In the electric motor MG, an MG torque Tm as an output torque from the electric motor MG is controlled such that a switching operation on the inverter 28 including a switching element (see FIG. 2) 28a functioning as a second vibration element is controlled by an electronic control unit (not illustrated). The electric motor MG is a vehicle driving electric motor configured to drive the vehicle 10 by outputting the MG torque Tm to the driving wheels 16. Note that, as the MG torque Tm, in a case of positive rotation in which a rotation direction of the electric motor MG is a rotation direction in forward travel of the vehicle 10, for example, a positive torque on an accelerating side is a motoring torque, and a negative torque on a decelerating side is a regenerative torque. Further, as illustrated in FIG. 1, in the vehicle 10, a pump motor (not illustrated) provided in the electric-motor-driven oil pump EOP is connected to the battery 30 via the inverter 28.

As illustrated in FIG. 1, the vehicle 10 includes a DC/DC converter 32 connected to the battery 30, and an auxiliary battery 34 connected to the DC/DC converter 32. Note that the battery 30 is a high-voltage battery (a high-voltage-system battery) in which electric power with a voltage higher than that in the auxiliary battery 34 is accumulated. Further, the DC/DC converter 32 includes a reactor or a switching element 32a (see FIG. 2) functioning as a first vibration element, for example. The DC/DC converter 32 is configured to increase the voltage on the battery 30 side and decrease the voltage on the inverter 28 side such that a switching operation on the switching element 32a is controlled by an electronic control unit (not illustrated). Further, when the DC/DC converter 32 decreases the voltage of the battery 30, the auxiliary battery 34 can be charged, or electric power can be supplied to accessories (e.g., a fan motor, a power steering motor, a lamp, an audio system, and so on (not illustrated)) of the vehicle 10.

Figure 2:
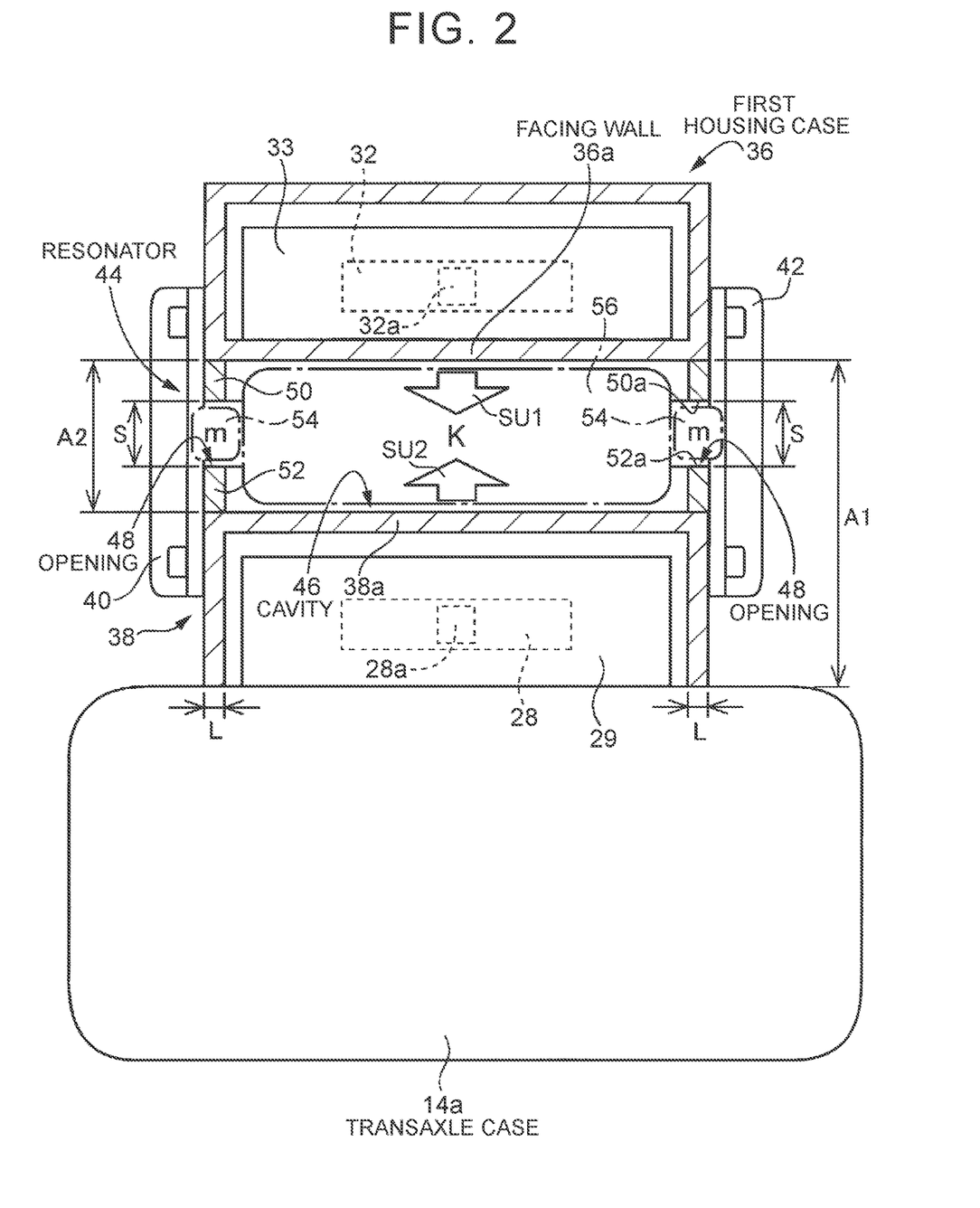
FIG. 2 is a sectional view to describe structures of a first housing case, a second housing case, and so on, for example, placed on a transaxle case of a transaxle provided in the vehicle illustrated in FIG. 1.

FIG. 2 is a sectional view to describe structures of a first housing case 36, a second housing case 38, and so on, for example, placed on the transaxle case 14a of the transaxle 14 provided in the vehicle 10 illustrated in FIG. 1. As illustrated in FIG. 2, the first housing case 36 is fastened by a pair of fastening arms 40, 42 fastened to the second housing case 38 fixed integrally to the transaxle case 14a, so that the first housing case 36 is fixed to the transaxle case 14a at a predetermined interval A1 determined in advance. Further, the first housing case 36 is a rectangular box-shaped container made of light metal and configured such that a first electronic circuit 33, e.g., the DC/DC converter 32 including the switching element 32a, or the like, is accommodated in the container. Further, the first housing case 36 is made of metal such as aluminum, for example. Note that the DC/DC converter 32 is sealed by the first housing case 36.

As illustrated in FIG. 2, the second housing case 38 is fixed integrally to the transaxle case 14a such that the second housing case 38 is disposed at a predetermined interval A2 determined in advance from a facing wall (a first facing wall) 36a of the first housing case 36. Note that the facing wall 36a of the first housing case 36 is a wall facing the transaxle case 14a among flat-shaped walls surrounding the first housing case 36. Further, the second housing case 38 is a rectangular box-shaped container made of light metal and configured such that a second electronic circuit 29, e.g., the inverter 28 including the switching element 28a, or the like, is accommodated in the container. Further, the second housing case 38 is made of metal such as aluminum, for example, similarly to the first housing case 36. Note that the inverter 28 is sealed by the second housing case 38 and the transaxle case 14a.

In the meantime, in the first housing case 36, when the facing wall 36a of the first housing case 36 resonates by being excited by vibrations caused from the DC/DC converter 32 due to the switching operation on the switching element 32a in the first electronic circuit 33, the facing wall 36a becomes a vibration source (a sound source) of an audio frequency. Further, in the second housing case 38, when a facing wall (a second facing wall) 38a of the second housing case 38 resonates by being excited by vibrations caused from the inverter 28 due to the switching operation on the switching element 28a in the second electronic circuit 29, the facing wall 38a becomes a vibration source (a sound source) of an audio frequency. In the present embodiment, a resonator 44 functioning as a Helmholtz resonator is formed between the facing wall 36a of the first housing case 36 and the facing wall 38a of the second housing case 38. The Helmholtz resonator functions as an abnormal noise reduction device configured to reduce abnormal noise caused from the transaxle 14 with the facing wall 36a of the first housing case 36 and/or the facing wall 38a of the second housing case 38 as vibration sources. Note that the facing wall 38a of the second housing case 38 is a wall facing the facing wall 36a of the first housing case 36 among flat-shaped walls surrounding the second housing case 38.

As illustrated in FIG. 2, the resonator 44 includes a first partition wall 50 and a second partition wall 52 each made of metal such as aluminum. The resonator 44 has a cavity 46 and an opening 48. The cavity 46 is formed by the first partition wall 50 and the second partition wall 52 between the facing wall 36a of the first housing case 36 and the facing wall 38a of the second housing case 38. The opening 48 is formed such that the cavity 46 is partially opened to a lateral side through the opening 48. Note that the first partition wall 50 is a wall projecting toward the transaxle case 14a from a position, in the facing wall 36a of the first housing case 36, that surrounds the periphery of the cavity 46. That is, the first partition wall 50 is a wall projecting toward the transaxle case 14a from a peripheral edge part of the facing wall 36a of the first housing case 36. That is, the first partition wall 50 is a wall integrally fixed to the facing wall 36a of the first housing case 36 and surrounding the periphery of the cavity 46. Further, the second partition wall 52 is a wall projecting toward a distal end 50a of the first partition wall 50 from a position, in the facing wall 38a of the second housing case 38, that surrounds the periphery of the cavity 46. That is, the second partition wall 52 is a wall projecting toward the distal end 50a of the first partition wall 50 from a peripheral edge part of the facing wall 38a of the second housing case 38. That is, the second partition wall 52 is a wall integrally fixed to the facing wall 38a of the second housing case 38 and surrounding the periphery of the cavity 46. Further, the opening 48 is a space continuously formed between the distal end 50a of the first partition wall 50 and a distal end 52a of the second partition wall 52 such that the opening 48 surrounds the periphery of the cavity 46. The opening 48 is a space through which the cavity 46 is partially opened toward the first partition wall 50 side and the second partition wall 52 side.

Figure 3:
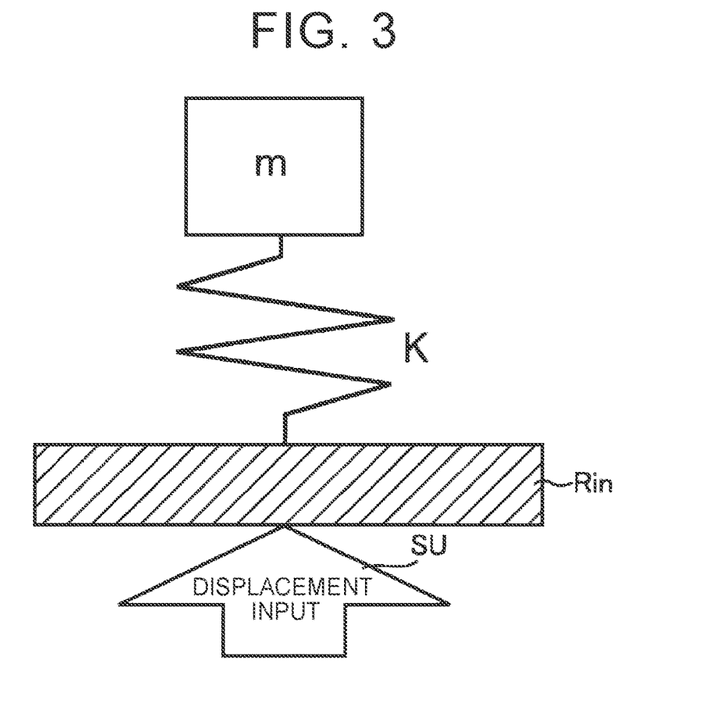
FIG. 3 is a view illustrating a one-degree-of-freedom spring-mass vibration system by a mass and a spring, the one-degree-of-freedom spring-mass vibration system being equivalent to a spring-mass model formed by air in a resonator formed between the first housing case and the second housing case in FIG. 2.
Figure 4:
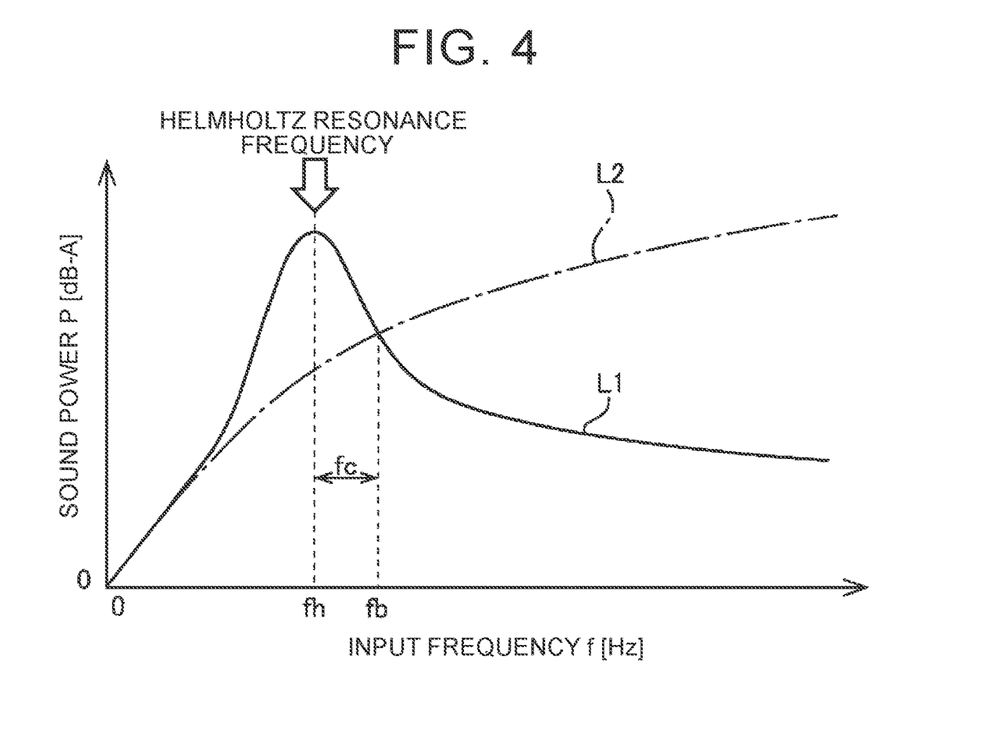
FIG. 4 is a view illustrating a frequency characteristic indicative of a relationship between an input frequency of a displacement input and a sound power emitted from the resonator in the one-degree-of-freedom spring-mass vibration system illustrated in FIG. 3.

In the resonator 44, in a case where a spring-mass model is assumed like FIG. 2, an air 54 in the opening 48 functions as a mass m of the spring-mass model, an air 56 in the cavity 46 functions as a spring K that connects the mass m to an input end Rin (see FIG. 3), and the air 54 and the air 56 constitute a one-degree-of-freedom spring-mass vibration system illustrated in FIG. 3. FIG. 3 is a view illustrating, by the mass m and the spring K, a one-degree-of-freedom spring-mass vibration system equivalent to the spring-mass model constituted by the airs 54, 56 in the resonator 44. In FIG. 2, a sound (a radiation sound) expressed by an arrow SU1 and a sound (a radiation sound) expressed by an arrow SU2, that is, a sound in the cavity 46 acts as a displacement input that vibrates the input end Rin in an expansion-contraction direction of the spring K as indicated by an arrow SU in FIG. 3. Note that the sound expressed by the arrow SU1 is a sound caused from the facing wall 36a of the first housing case 36 as a vibration source (a sound source). Further, the sound expressed by the arrow SU2 is a sound caused from the facing wall 38a of the second housing case 38 as a vibration source (a sound source). The one-degree-of-freedom spring-mass vibration system illustrated in FIG. 3 has a frequency characteristic, as illustrated in FIG. 4, that indicates a relationship between an input frequency f [Hz] of the displacement input and a sound power P [dB-A] emitted from the resonator 44. The frequency characteristic illustrated in FIG. 4 is found by computer analysis or the like, for example. Note that, in the frequency characteristic illustrated in FIG. 4, a continuous line L1 indicates measured values when the resonator 44 of the present embodiment is used, and an alternate long and short dash line L2 indicates measured values when the first partition wall 50 and the second partition wall 52 are removed from the resonator 44 of the present embodiment, for example, that is, when the resonator 44 is removed from between the first housing case 36 and the second housing case 38.

As indicated by the alternate long and short dash line L2 in FIG. 4, in a case where the resonator 44 is not formed, the sound power P increases as the input frequency f increases. Further, as indicated by the continuous line L1 in FIG. 4, in the resonator 44, as the input frequency f increases, the sound power P increases until the input frequency f reaches a natural frequency fh of the one-degree-of-freedom spring-mass vibration system in FIG. 3, that is, a resonance frequency (a Helmholtz resonance frequency) fh of the resonator 44. That is, in the one-degree-of-freedom spring-mass vibration system in FIG. 3, the vibration of the mass m is amplified relative to the displacement input until the input frequency f increases to the natural frequency fh. However, as indicated by the continuous line L1 in FIG. 4, in the resonator 44, when the input frequency f becomes higher than the resonance frequency fh, the sound power P decreases as the input frequency f increases. That is, in the one-degree-of-freedom spring-mass vibration system in FIG. 3, when the input frequency f becomes higher than the natural frequency fh, the vibration of the displacement input becomes hard to be transmitted to the mass m as the input frequency f increases. That is, in the resonator 44, in a frequency bandwidth in which the input frequency f is higher than the resonance frequency fh, the cavity 46 does not resonate, so that the sound in the cavity 46 is hard to be transmitted to the air 54 in the opening 48.

In the resonator 44 of the present embodiment, the resonance frequency fh is set such that the input frequency f falls within a frequency bandwidth higher than the resonance frequency fh, that is, the resonance frequency fh is lower than resonance frequencies of the facing wall 36a and the facing wall 38a functioning as sound sources of audio frequencies. More specifically, in the resonator 44, the resonance frequency fh is set such that the resonance frequency fh is lower than respective natural frequencies f1 [Hz] and f2 [Hz] of the facing wall 36a of the first housing case 36 and the facing wall 38a of the second housing case 38, the facing wall 36a and the facing wall 38a functioning as sound sources. Further, preferably, in the resonator 44, the resonance frequency fh may be set such that a boundary frequency fb [Hz] is lower than the natural frequency f1 [Hz] of the facing wall 36a of the first housing case 36 and the natural frequency f2 [Hz] of the facing wall 38a of the second housing case 38. Note that the boundary frequency fb is an input frequency f indicative of a boundary where the sound power P of the continuous line L1 becomes lower than the sound power P of the alternate long and short dash line L2 as illustrated in FIG. 4. The boundary frequency fb is a frequency obtained by adding a predetermined frequency fc determined in advance to the resonance frequency fh, for example. Further, the sound expressed by the arrow SU1 is a sound caused when the facing wall 36a of the first housing case 36 resonates as the frequency of vibrations caused from the DC/DC converter 32 nears the natural frequency f1 of the facing wall 36a of the first housing case 36. Further, the sound expressed by the arrow SU2 is a sound caused when the facing wall 38a of the second housing case 38 resonates as the frequency of vibrations caused from the inverter 28 nears the natural frequency f2 of the facing wall 38a of the second housing case 38.

Note that, as the resonance frequency fh of the resonator 44, an approximate value can be calculated by use of Math. 1 (Helmholtz equation) as follows. Here, in Math. 1, "v" indicates a sonic velocity (=340 m/s), "S" is an aperture area of the opening 48, "V" is a volume of the cavity 46, and "L" is a length of the opening 48. Further, "δ" is a correction value, that is, an open end correction coefficient to be determined in accordance with the shape of the resonator 44 and is found by experiment or the like. In the resonator 44 of the present embodiment, the volume V of the cavity 46 and a volume Vk of the opening 48 are set such that the resonance frequency fh is lower than the natural frequencies f1 and f2 of the facing wall 36a of the first housing case 36 and the facing wall 38a of the second housing case 38, the facing wall 36a and the facing wall 38a functioning as sound sources. Note that the volume Vk of the opening 48 is calculated from the aperture area S and the length L.

$$fh \approx \frac{v}{2 \times \pi} \times \sqrt{\frac{S}{V \times (L + \delta)}} \qquad \text{Math. 1}$$

As described above, in the transaxle 14 of the present embodiment, the resonator 44 has the cavity 46 formed between the transaxle case 14a and the facing wall 36a, of the first housing case 36, that faces the transaxle case 14a, and the opening 48 through which the cavity 46 is partially opened to the lateral side. The volume V of the cavity 46 and the volume Vk of the opening 48 are set such that the resonance frequency fh of the resonator 44 is lower than the natural frequency f1 of the facing wall 36a of the first housing case 36. Since the resonance frequency fh of the resonator 44 is lower than the natural frequency f1 of the facing wall 36a functioning as a sound source, even when the facing wall 36a vibrates at the natural frequency f1, the cavity 46 does not resonate. Hereby, abnormal noise caused from the transaxle 14 can be reduced.

Further, in the transaxle 14 of the present embodiment, the second housing case 38 in which the inverter 28 including the switching element 28a functioning as a vibration source is accommodated is fixed to the transaxle case 14a such that the second housing case 38 is disposed at the predetermined interval A2 from the facing wall 36a of the first housing case 36, and the cavity 46 is formed between the facing wall 36a and the facing wall 38a, of the second housing case 38, that faces the facing wall 36a. The volume V of the cavity 46 and the volume Vk of the opening 48 are set such that the resonance frequency fh of the resonator 44 is lower than the natural frequencies f1 and f2 of the facing wall 36a and the facing wall 38a functioning as sound sources. Since the resonance frequency fh of the resonator 44 is lower than the natural frequency f1 of the facing wall 36a and the natural frequency f2 of the facing wall 38a, even when the facing wall 36a vibrates at the natural frequency f1 and the facing wall 38a vibrates at the natural frequency f2, for example, the cavity 46 does not resonate. Hereby, abnormal noise caused from the transaxle 14 can be reduced.

Further, in the transaxle 14 of the present embodiment, the first partition wall 50 is provided such that the first partition wall 50 projects toward the transaxle case 14a from the position, in the first housing case 36, that surrounds the periphery of the cavity 46, and the second partition wall 52 is provided such that the second partition wall 52 projects toward the first partition wall 50 from the second housing case 38. The opening 48 is continuously formed between the distal end 50a of the first partition wall 50 and the distal end 52a of the second partition wall 52 such that the opening 48 surrounds the periphery of the cavity 46. Due to the volume V of the opening 48 formed as such and the volume Vk of the cavity 46, the resonance frequency fh of the resonator 44 is made lower than the natural frequencies f1 and f2 of the facing wall 36a and the facing wall 38a functioning as sound sources.

Next will be described other embodiments of the present disclosure. Note that, in the following description, parts common in those embodiments have the same reference sign, and descriptions thereof are omitted.

Embodiment 2

Figure 5:
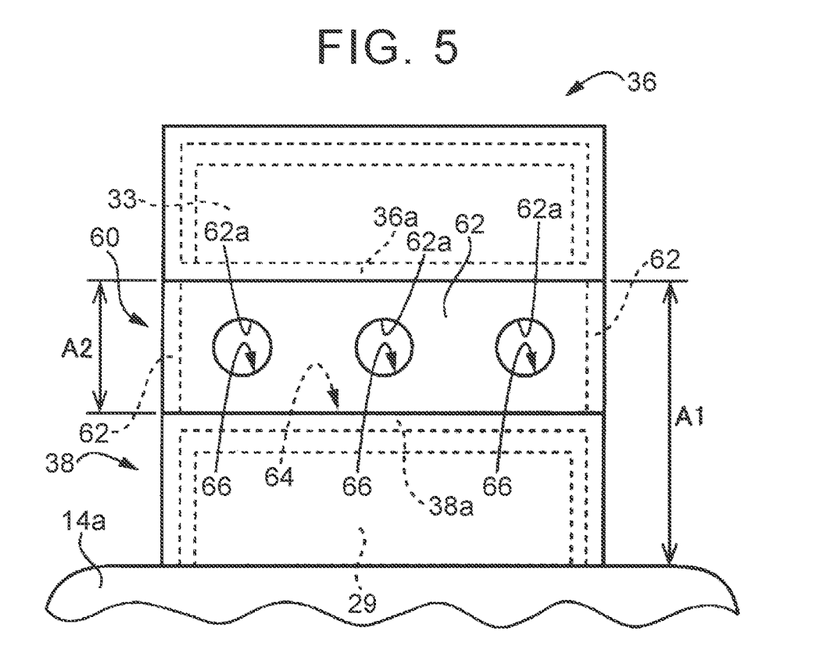
FIG. 5 is a view illustrating a resonator provided in a transaxle of another embodiment (Embodiment 2) of the present disclosure.

FIG. 5 is a view to describe a resonator 60 provided in a transaxle of another embodiment of the present disclosure and functioning as a Helmholtz resonator. The transaxle of the present embodiment is different from the transaxle 14 of Embodiment 1 in that the shape of the resonator 60 is different from the shape of the resonator 44, the fastening arms 40, 42 are not provided, and the first housing case 36 and the second housing case 38 are fixed by a peripheral wall 62 provided in the resonator 60. Other configurations of the resonator 60 are generally the same as those of the transaxle 14 of Embodiment 1.

As illustrated in FIG. 5, the resonator 60 includes the peripheral wall 62 made of metal such as aluminum. Since the peripheral wall 62 is provided, the resonator 60 has a cavity 64 formed between the facing wall 36a of the first housing case 36 and the facing wall 38a of the second housing case 38, and an opening 66 through which the cavity 64 is partially opened to the lateral side. Note that the peripheral wall 62 is a wall via which respective positions, in the first housing case 36 and the second housing case 38, that surround the periphery of the cavity 64 are connected to each other. That is, the peripheral wall 62 is a wall via which the position, in the facing wall 36a of the first housing case 36, that surrounds the periphery of the cavity 64 is connected to the position, in the facing wall 38a of the second housing case 38, that surrounds the periphery of the cavity 64. That is, the peripheral wall 62 is a wall surrounding the periphery of the cavity 64 and connecting a peripheral edge part of the facing wall 36a of the first housing case 36 to a peripheral edge part of the facing wall 38a of the second housing case 38. Further, the opening 66 is constituted by round through-holes 62a penetrating through the peripheral wall 62. Note that the peripheral wall 62 is a wall configured such that four flat-shaped walls surround the periphery of the cavity 64, for example, and in the present embodiment, the through-holes 62a are formed in one of the four flat-shaped walls constituting the peripheral wall 62. Further, the opening 66 is a space through which the cavity 64 is partially opened toward the peripheral wall 62 side. In the resonator 60 of the present embodiment, the volume V of the cavity 64 and the volume Vk of the opening 66 are set such that the resonance frequency fh is lower than the natural frequency f1 of the facing wall 36a of the first housing case 36 and the natural frequency f2 of the facing wall 38a of the second housing case 38.

As described above, in the transaxle of the present embodiment, the peripheral wall 62 is formed such that respective positions, in the first housing case 36 and the second housing case 38, that surround the periphery of the cavity 64 are connected to each other via the peripheral wall 62, and the opening 66 is constituted by the through-holes 62a penetrating through the peripheral wall 62. Due to the volume Vk of the opening 66 formed as such and the volume V of the cavity 64, the resonance frequency fh of the resonator 60 is made lower than the natural frequencies f1 and f2 of the facing wall 36a of the first housing case 36 and the facing wall 38a of the second housing case 38, the facing wall 36a and the facing wall 38a functioning as sound sources.

Embodiment 3

Figure 6:
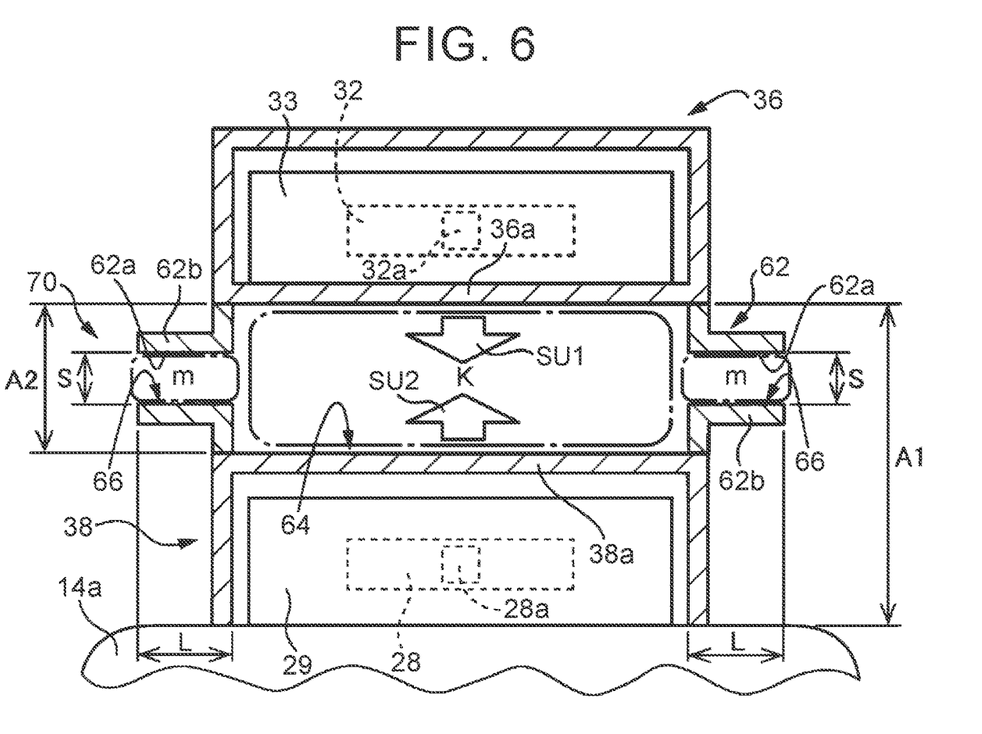
FIG. 6 is a view illustrating a resonator provided in a transaxle of another embodiment (Embodiment 3) of the present disclosure.

FIG. 6 is a view to describe a resonator 70 provided in a transaxle of another embodiment of the present disclosure and functioning as a Helmholtz resonator. The transaxle of the present embodiment is different from the transaxle of Embodiment 2 in that the through-holes 62a are formed in two of the four flat-shaped walls constituting the peripheral wall 62, and the opening 66 is constituted by tubular members 62b having a cylindrical shape and connected to the through-holes 62a. Other configurations are generally the same as those of the transaxle of Embodiment 2. Note that, in the resonator 70 of the present embodiment, the volume V of the cavity 64 and the volume Vk of the opening 66 are set such that the resonance frequency fh is lower than the natural frequency f1 of the facing wall 36a of the first housing case 36 and the natural frequency f2 of the facing wall 38a of the second housing case 38.

As described above, in the transaxle of the present embodiment, the opening 66 is constituted by the tubular members 62b connected to the through-holes 62a. Due to the volume Vk of the opening 66 formed as such and the volume V of the cavity 64, the resonance frequency fh of the resonator 70 is made lower than the natural frequencies f1 and f2 of the facing wall 36a of the first housing case 36 and the facing wall 38a of the second housing case 38, the facing wall 36a and the facing wall 38a functioning as sound sources.

Embodiment 4

Figure 7:
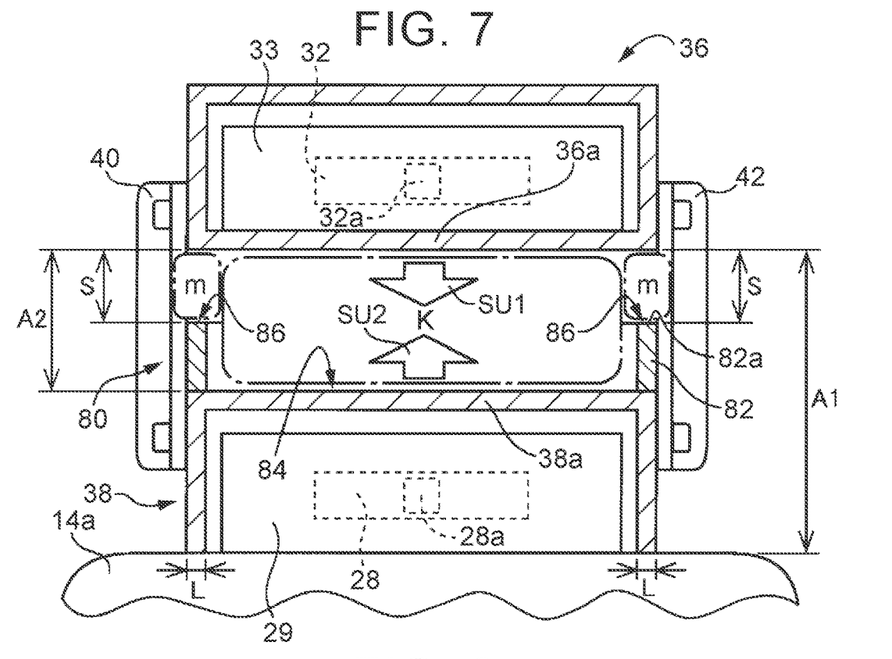
FIG. 7 is a view illustrating a resonator provided in a transaxle of another embodiment (Embodiment 4) of the present disclosure.

FIG. 7 is a view to describe a resonator 80 provided in a transaxle of another embodiment of the present disclosure and functioning as a Helmholtz resonator. The transaxle of the present embodiment is different from the transaxle 14 of Embodiment 1 in that the shape of the resonator 80 is different from the shape of the resonator 44, and other configurations are generally the same as those of the transaxle 14 of Embodiment 1.

As illustrated in FIG. 7, the resonator 80 includes a partition wall 82 made of metal such as aluminum. Since the partition wall 82 is provided, the resonator 80 has a cavity 84 formed between the facing wall 36a of the first housing case 36 and the facing wall 38a of the second housing case 38, and an opening 86 through which the cavity 84 is partially opened to the lateral side. Note that the partition wall 82 is a wall projecting toward the facing wall 36a of the first housing case 36 from a position, in the facing wall 38a of the second housing case 38, that surrounds the periphery of the cavity 84. That is, the partition wall 82 is a wall projecting toward the facing wall 36a of the first housing case 36 from a peripheral edge part of the facing wall 38a of the second housing case 38. That is, the partition wall 82 is a wall integrally fixed to the facing wall 38a of the second housing case 38 and surrounding the periphery of the cavity 84. Further, the opening 86 is a space continuously formed between a distal end 82a of the partition wall 82 and the facing wall 36a of the first housing case 36 such that the opening 86 surrounds the periphery of the cavity 84. The opening 86 is a space through which the cavity 84 is partially opened toward the partition wall 82 side. Note that, in the resonator 80 of the present embodiment, the volume V of the cavity 84 and the volume Vk of the opening 86 are set such that the resonance frequency fh is lower than the natural frequencies f1 and f2 of the facing wall 36a of the first housing case 36 and the facing wall 38a of the second housing case 38, the facing wall 36a and the facing wall 38a functioning as sound sources.

As described above, in the transaxle of the present embodiment, the partition wall 82 is provided so as to project toward the first housing case 36 from the position, in the second housing case 38, that surrounds the periphery of the cavity 84, and the opening 86 is continuously formed between the distal end 82a of the partition wall 82 and the first housing case 36 such that the opening 86 surrounds the periphery of the cavity 84. Due to the volume Vk of the opening 86 formed as such and the volume V of the cavity 84, the resonance frequency fh of the resonator 80 is made lower than the natural frequencies f1 and f2 of the facing wall 36a of the first housing case 36 and the facing wall 38a of the second housing case 38, the facing wall 36a and the facing wall 38a functioning as sound sources.

Embodiment 5

Figure 8:
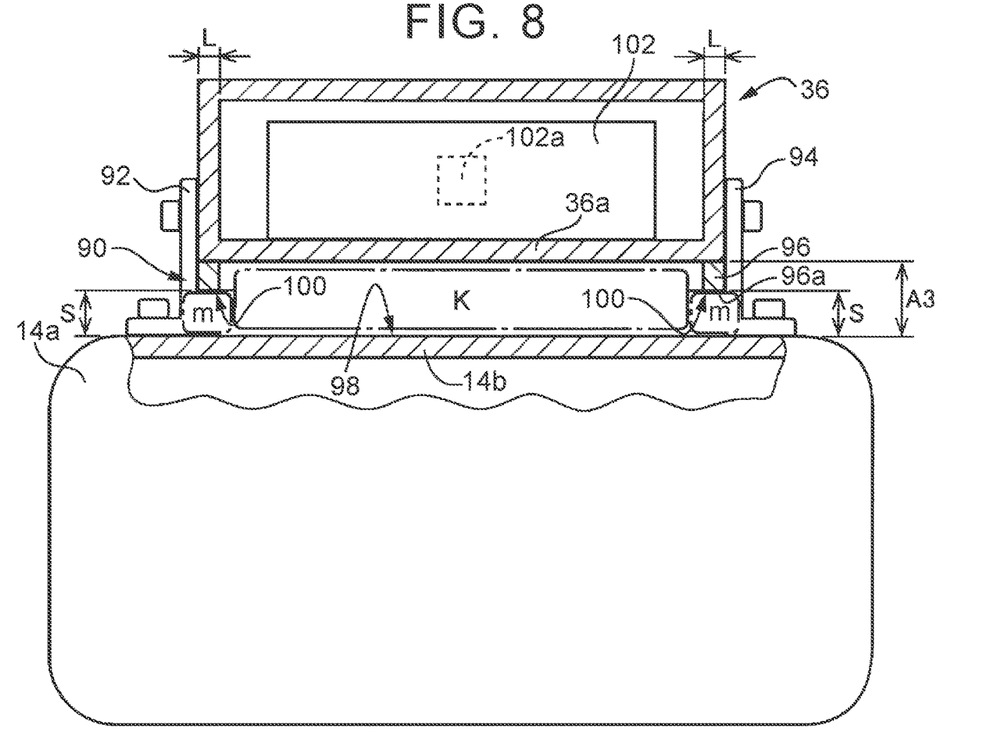
FIG. 8 is a view illustrating a resonator provided in a transaxle of another embodiment (Embodiment 5) of the present disclosure.

FIG. 8 is a view to describe a resonator 90 provided in a transaxle of another embodiment of the present disclosure and functioning as a Helmholtz resonator. The transaxle of the present embodiment is different from the transaxle 14 of Embodiment 1 in that a vibration source such as an actuator for a shift-by-wire device or the electric-motor-driven oil pump EOP is accommodated in the first housing case 36, for example, and the first housing case 36 is fixed by a pair of fastening arms 92, 94 to the transaxle case 14a at a predetermined interval A3. Other configurations are generally the same as those of the transaxle 14 of Embodiment 1.

As illustrated in FIG. 8, the resonator 90 includes a third partition wall 96 made of metal such as aluminum. Since the third partition wall 96 is provided, the resonator 90 has a cavity 98 formed between the facing wall 36a of the first housing case 36 and a facing wall (a third facing wall) 14b of the transaxle case 14a, and an opening 100 through which the cavity 98 is partially opened to the lateral side. Note that the facing wall 14b of the transaxle case 14a is a wall facing the facing wall 36a of the first housing case 36 among flat-shaped walls surrounding the transaxle case 14a. Further, the third partition wall 96 is a wall projecting toward the facing wall 14b of the transaxle case 14a from a position, in the facing wall 36a of the first housing case 36, that surrounds the periphery of the cavity 98. That is, the third partition wall 96 is a wall projecting toward the facing wall 14b of the transaxle case 14a from the peripheral edge part of the facing wall 36a of the first housing case 36. That is, the third partition wall 96 is a wall integrally fixed to the facing wall 36a of the first housing case 36 and surrounding the periphery of the cavity 98. Further, the opening 100 is continuously formed between a distal end 96a of the third partition wall 96 and the facing wall 14b of the transaxle case 14a such that the opening 100 surrounds the periphery of the cavity 98. The opening 100 is a space through which the cavity 98 is partially opened toward the third partition wall 96 side.

Note that, in the first housing case 36, when the facing wall 36a of the first housing case 36 resonates by being excited by vibrations caused from a switching element (a first vibration element) 102a in an electronic circuit 102 configured to drive the actuator for the shift-by-wire device or the electric-motor-driven oil pump EOP, the actuator for the shift-by-wire device, the electric-motor-driven oil pump EOP, or the like, the facing wall 36a may become a vibration source (a sound source). Further, in the transaxle case 14a, when the facing wall 14b of the transaxle case 14a resonates by being excited by vibrations caused inside the transaxle case 14a, the facing wall 14b may become a vibration source (a sound source). In the resonator 90 of the present embodiment, the volume V of the cavity 98 and the volume Vk of the opening 100 are set such that the resonance frequency fh is lower than the natural frequency f1 of the facing wall 36a of the first housing case 36 and a natural frequency f3 of the facing wall 14b of the transaxle case 14a.

As described above, in the transaxle of the present embodiment, in the transaxle case 14a, the facing wall 14b facing the facing wall 36a of the first housing case 36 is formed, and the cavity 98 is formed between the facing wall 36a of the first housing case 36 and the facing wall 14b of the transaxle case 14a. Further, the volume V of the cavity 98 and the volume Vk of the opening 100 are set such that the resonance frequency fh of the resonator 90 is lower than the natural frequencies f1 and f3 of the facing wall 36a of the first housing case 36 and the facing wall 14b of the transaxle case 14a, the facing wall 36a and the facing wall 14b functioning as sound sources. Thus, the resonance frequency fh of the resonator 90 is lower than the natural frequencies f1 and f3 of the facing wall 36a of the first housing case 36 and the facing wall 14b of the transaxle case 14a, the facing wall 36a and the facing wall 14b functioning as sound sources. Accordingly, even when the facing wall 36a of the first housing case 36 vibrates at the natural frequency f1, and the facing wall 14b of the transaxle case 14a vibrates at the natural frequency f3, for example, the cavity 98 does not resonate. Hereby, abnormal noise caused from the transaxle can be reduced.

Further, in the transaxle of the present embodiment, the third partition wall 96 is provided such that the third partition wall 96 projects toward the transaxle case 14a from the position, in the first housing case 36, that surrounds the periphery of the cavity 98, and the opening 100 is continuously formed between the distal end 96a of the third partition wall 96 and the transaxle case 14a such that the opening 100 surrounds the periphery of the cavity 98. Due to the volume Vk of the opening 100 formed as such and the volume V of the cavity 98, the resonance frequency fh of the resonator 90 functioning as a Helmholtz resonator is made lower than the natural frequencies f1 and f3 of the facing wall 36a of the first housing case 36 and the facing wall 14b of the transaxle case 14a.

The embodiments of the present disclosure have been described in detail with reference to the drawings, but the present disclosure is also applied to other aspects.

For example, in Embodiments 1, 2, 3, 4, the DC/DC converter 32 is accommodated in the first housing case 36, and in Embodiment 5, the actuator for the shift-by-wire device, the electric-motor-driven oil pump EOP, or the like is accommodated in the first housing case 36, for example. However, a device other than the DC/DC converter 32, the actuator for the shift-by-wire device, and the electric-motor-driven oil pump EOP may be accommodated in the first housing case 36. That is, any device may be accommodated in the first housing case 36, provided that the device functions as a vibration source.

Further, in Embodiments 1, 2, 3, 4, the inverter 28 is accommodated in the second housing case 38. However, a device other than the inverter 28 may be accommodated in the second housing case 38. That is, any device may be accommodated in the second housing case 38, provided that the device functions as a vibration source.

Further, in Embodiment 2, the through-holes 62a are formed in one of the four flat-shaped walls constituting the peripheral wall 62, but the through-holes 62a may be formed in two or more walls of the four flat-shaped walls constituting the peripheral wall 62, for example.

These are merely one embodiment to the utmost, and the present disclosure can be performed in an embodiment to which various changes and improvements are added based on the knowledge of a person skilled in the art.

What is claimed is:

1. A vehicle transaxle in which a first housing case is fixed to a transaxle case at a predetermined interval, the first housing case being configured such that a first vibration element is accommodated in the first housing case, the transaxle case being configured such that a vehicle driving electric motor is accommodated in the transaxle case, the vehicle transaxle comprising a resonator having a cavity and an opening, the cavity being formed between the transaxle case and a first facing wall of the first housing case, the first facing wall facing the transaxle case, the opening being formed such that the cavity is partially opened to a lateral side through the opening, wherein:

a volume of the cavity and a volume of the opening are set such that a resonance frequency of the resonator is lower than a natural frequency of the first facing wall of the first housing case;

a second housing case in which a second vibration element is accommodated is fixed to the transaxle case such that the second housing case is disposed at a predetermined interval from the first facing wall of the first housing case;

the cavity is formed between the first facing wall and a second facing wall of the second housing case, the second facing wall facing the first facing wall; and the volume of the cavity and the volume of the opening are set such that the resonance frequency of the resonator is lower than the natural frequency of the first facing wall and a natural frequency of the second facing wall.

2. The vehicle transaxle according to claim 1, further comprising:

a first partition wall projecting toward the transaxle case from a position, in the first housing case, that surrounds a periphery of the cavity; and a second partition wall projecting toward the first partition wall from the second housing case, wherein the opening is continuously formed between a distal end of the first partition wall and a distal end of the second partition wall such that the opening surrounds the periphery of the cavity.

3. The vehicle transaxle according to claim 1, further comprising a peripheral wall via which respective positions, in the first housing case and the second housing case, that surround a periphery of the cavity are connected to each other, wherein the opening is constituted by a through-hole penetrating through the peripheral wall.

4. The vehicle transaxle according to claim 3, wherein the opening is constituted by a tubular member connected to the through-hole.

5. The vehicle transaxle according to claim 1, further comprising a partition wall projecting toward the first housing case from a position, in the second housing case, that surrounds a periphery of the cavity, wherein the opening is continuously formed between a distal end of the partition wall and the first housing case such that the opening surrounds the periphery of the cavity.

6. The vehicle transaxle according to claim 1, wherein:

a third facing wall facing the first facing wall of the first housing case is formed in the transaxle case;

the cavity is formed between the first facing wall and the third facing wall; and the volume of the cavity and the volume of the opening are set such that the resonance frequency of the resonator is lower than the natural frequency of the first facing wall and a natural frequency of the third facing wall.

7. The vehicle transaxle according to claim 6, further comprising a third partition wall projecting toward the transaxle case from a position, in the first housing case, that surrounds a periphery of the cavity, wherein the opening is continuously formed between a distal end of the third partition wall and the transaxle case such that the opening surrounds the periphery of the cavity.

* * * * *